March 24, 1925
J. RITTER
1,530,621
LIGHT PROJECTING APPARATUS
Filed Feb. 21, 1923
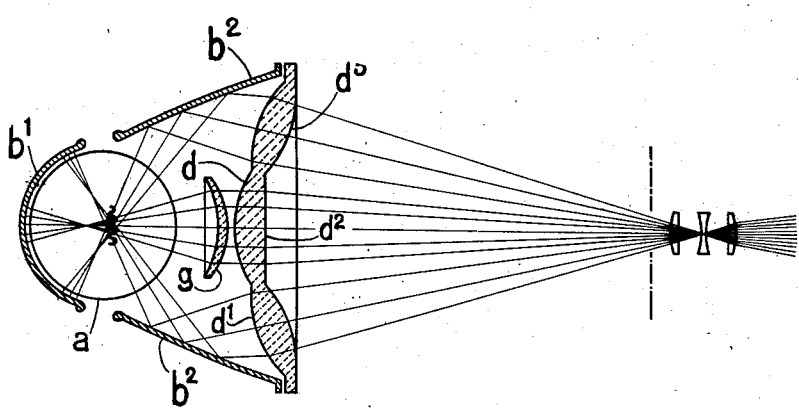
Inventor
J. Ritter Patented Mar. 24, 1925.

1,530,621

UNITED STATES PATENT OFFICE.

JAKOB RITTER, OF BASEL, SWITZERLAND.

LIGHT-PROJECTING APPARATUS.

Application filed February 21, 1923. Serial No. 620,517.

*To all whom it may concern:*

Be it known that I, JAKOB RITTER, a citizen of the Swiss Republic, and resident of Basel, Switzerland, have invented new and useful Improvements in Light-Projecting Apparatus, of which the following is a full, clear, and exact specification.

This invention relates to light projecting apparatus and has for its object an improvement in or modification of the apparatus described in the specification of my U. S. patent application Ser. No. 474704, filed June 3, 1921. The projection apparatus therein described is characterized by the combination with a lamp of a catoptric light condenser and a dioptric light condenser, the latter of which comprises a liquid lens near to the lamp with a forward and rearward annular lenticular zone and a rear glass lens at a substantial distance beyond the liquid lens, and being so arranged as to concentrate the rays from the catoptric light condenser through its annular lenticular zone to said rear glass lens, in order that the rays are projected on the projection screen.

In the construction of the dioptric light condenser it is in some cases advantageous to make this not of a liquid lens device, but of solid glass and, according to the present improvement, the front and rear lenticular annular surfaces of the condenser are combined with the lenticular middle part of the condenser so as to be constituted by a single integral lens of solid glass.

The accompanying drawing illustrates a constructional form of the invention.

As in the apparatus of the above specification a reflector or catoptric light condenser is provided having a hollow spherical surface portion $b^1$ arranged behind the lamp $a$, and a hollow spherical surface portion $b^2$ arranged in front of the lamp $a$. The dioptric light condenser consists of two lens portions formed as an integral piece of solid glass, that is to say, a middle portion with a convex lens surface $d$ facing the lamp and a plane lens surface $d^2$ on the opposite side, together with an annular lens extending around said middle portion and having a forward lenticular convex zone $d^1$ and a rearward lenticular convex zone $d^3$. The rays of light reflected from the reflector or catoptric light condenser $b^1$, $b^2$ and past the middle lens portion $d$, $d^2$ are refracted by the annular lens zones $d^1$ $d^3$ in the proper manner so as to converge on to the projection surface or screen, together with the rays directed through the middle portion $d$, $d^2$ of the lens. Another lens $g$ interposed between the lamp and the dioptric light condenser serves to collect the central rays of light.

What I claim is:

In a light projecting apparatus of the kind referred to, the combination with a catoptric light condenser of a single integral lens of solid glass at the forward end of said catoptric light condenser, forming a dioptric light condenser and comprising a middle lens portion and thereabout a forward and rearward annular convex lenticular zone to concentrate the reflected light rays, substantially as described.

In witness whereof I have hereunto signed my name this 2nd day of February, 1923, in the presence of two subscribing witnesses.

JAKOB RITTER.

Witnesses:
AMAND BRAUN,
MARGUERITE STAEHELI.